United States Patent
Kawanishi

(10) Patent No.: US 9,356,690 B2
(45) Date of Patent: May 31, 2016

(54) OPTICAL COMMUNICATION MODULE, METHOD FOR RECORDING LOG OF OPTICAL COMMUNICATION MODULE, AND OPTICAL COMMUNICATION APPARATUS

(75) Inventor: Yasuyuki Kawanishi, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 49 days.

(21) Appl. No.: 14/365,708

(22) PCT Filed: Aug. 8, 2012

(86) PCT No.: PCT/JP2012/070214
§ 371 (c)(1),
(2), (4) Date: Jun. 16, 2014

(87) PCT Pub. No.: WO2013/099344
PCT Pub. Date: Jul. 4, 2013

(65) Prior Publication Data
US 2015/0003823 A1 Jan. 1, 2015

(30) Foreign Application Priority Data
Dec. 26, 2011 (JP) ................................. 2011-283291

(51) Int. Cl.
*H04B 10/07* (2013.01)
*H04B 10/40* (2013.01)
*G02B 6/42* (2006.01)

(52) U.S. Cl.
CPC .............. *H04B 10/07* (2013.01); *G02B 6/4286* (2013.01); *H04B 10/40* (2013.01)

(58) Field of Classification Search
None
See application file for complete search history.

(56) References Cited

U.S. PATENT DOCUMENTS

| | | | | |
|---|---|---|---|---|
| 5,879,173 A | * | 3/1999 | Poplawski | ........... G02B 6/4277 385/92 |
| 2004/0136708 A1 | | 7/2004 | Woolf et al. | |
| 2006/0269283 A1 | | 11/2006 | Iwadate | |
| 2009/0148156 A1 | | 6/2009 | Hattori | |
| 2010/0150567 A1 | | 6/2010 | Kondo et al. | |
| 2010/0284698 A1 | * | 11/2010 | McColloch | .......... G02B 6/4201 398/135 |

FOREIGN PATENT DOCUMENTS

| | | |
|---|---|---|
| EP | 1 096 625 A2 | 5/2001 |
| JP | 2001-189514 A | 7/2001 |
| JP | 2004222297 A | 8/2004 |
| JP | 2006319893 A | 11/2006 |
| JP | 2009-147441 A | 7/2009 |
| JP | 2010-141774 A | 6/2010 |
| JP | 2010-161525 A | 7/2010 |
| WO | WO-2005/107105 A1 | 11/2005 |

* cited by examiner

*Primary Examiner* — Darren E Wolf
(74) *Attorney, Agent, or Firm* — Drinker Biddle & Reath LLP

(57) ABSTRACT

An optical communication module includes a control unit, a nonvolatile memory and a volatile memory. The control unit monitors the optical communication module and repeatedly receives log information about a state of a host substrate from the host substrate. The control unit stores the log information in the volatile memory, together with a result of monitoring of the optical communication module. When a hazard signal indicating an abnormality relating to power supply from the host substrate is detected, the control unit writes, in the nonvolatile memory, the result of monitoring of the optical communication module and the log information from the host substrate.

5 Claims, 8 Drawing Sheets

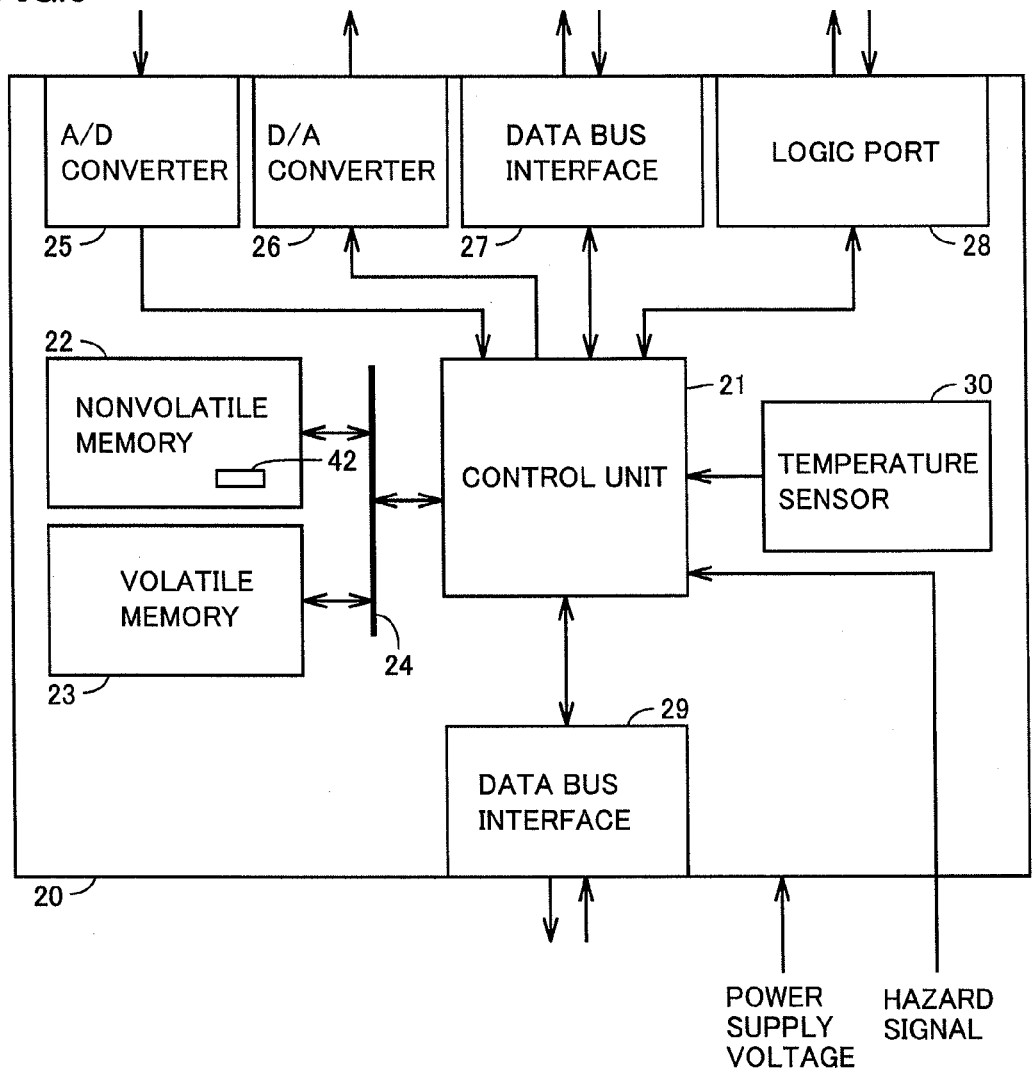

FIG.9

| MONITOR VALUE | TYPE |
|---|---|
| TEMPERATURE | TEMPERATURE IS HIGH |
| | TEMPERATURE IS LOW |
| INTENSITY OF OUTPUT LIGHT | INTENSITY OF OUTPUT LIGHT IS HIGH |
| | INTENSITY OF OUTPUT LIGHT IS LOW |
| INTENSITY OF RECEIVED LIGHT | INTENSITY OF RECEIVED LIGHT IS HIGH |

# OPTICAL COMMUNICATION MODULE, METHOD FOR RECORDING LOG OF OPTICAL COMMUNICATION MODULE, AND OPTICAL COMMUNICATION APPARATUS

TECHNICAL FIELD

The present invention relates to an optical communication module, a method for recording a log of an optical communication module, and an optical communication apparatus. More specifically, the present invention relates to an optical communication module configured to store log information.

BACKGROUND ART

An optical transceiver is a kind of optical communication module. The optical transceiver generally has a capability of converting an electrical signal and an optical signal to and from each other, a capability of receiving an optical signal from an optical communication cable, and a capability of transmitting an optical signal to an optical communication cable. Where the optical transceiver fails, a technical expert of the manufacturer of the transceiver may analyze the optical transceiver. Japanese Patent Laying-Open No. 2004-222297 (PTD 1) or International Publication No. WO2005/107105 (PTD 2) discloses a method according to which information about an optical transceiver is held in the optical transceiver.

CITATION LIST

Patent Document

PTD 1: Japanese Patent Laying-Open No. 2004-222297
PTD 2: International Publication No. WO2005/107105

SUMMARY OF INVENTION

Technical Problem

In the case where an abnormality occurs to optical communication, it is important for a provider of the optical communication system to immediately return the optical communication to a normal state. In many cases, one host substrate is mounted with a plurality of optical communication modules (optical transceivers in many cases). If a certain host substrate is the cause of an abnormality of the optical communication, the provider usually considers replacing the host substrate. Therefore, even if a plurality of optical communication modules mounted on the host substrate are estimated to have caused the abnormality, the host substrate may be replaced.

In view of such an operation as described above, a host substrate may be mounted with a memory (nonvolatile memory for example) for storing log information about the state of the whole of the host substrate. A technical expert of the manufacturer of the optical communication modules can test an optical communication module itself to determine whether or not this optical communication module is failing. However, in order to ascertain in what situation the optical communication module enters a failure state, it is necessary to analyze the log information held in the memory of the host substrate. Therefore, when only the optical communication module which has failed is returned to the technical expert of the manufacturer, the technical expert of the manufacturer cannot know the situation in which the optical communication module enters the failure state.

In order to solve this problem, a method according to which information is held in the optical transceiver, like the one disclosed in above-referenced Japanese Patent Laying-Open No. 2004-222297 (PTD 1) or International Publication No. WO2005/107105 (PTD 2), can be adopted to configure the optical communication module. However, it is more important for analysis of the cause of the failure of the optical communication module to have the information about the situation in which the optical communication module enters the failure state. Above-referenced PTD 1 and PTD 2 are both silent about the method for leaving, in the optical communication module, information about the situation in which the optical communication module enters a failure state.

Furthermore, the failure of the optical communication module may be caused by an abnormality of the host substrate, and thus, the information about the state of the host substrate immediately before the failure of the optical communication module is also considered to be important for analysis of the cause of the failure of the optical communication module. PTD 1 and PTD 2 do not, however, describe in detail the host substrate having the optical communication modules mounted thereon. Therefore, PTD 1 and PTD 2 are both silent about the technique of leaving, in the optical communication module, the information about the state of the host substrate.

Japanese Patent Laying-Open No. 2004-222297 (PTD 1) also discloses that any of a volatile storage device and a nonvolatile storage device may be used as a memory for storing information about a failure. In the case where the volatile storage device is used, however, stoppage of supply of a power supply voltage to the optical communication module causes the information stored in the volatile storage device to be lost. Accordingly, there is a possibility that the information stored in the optical communication module is lost, for example, when the power supply voltage becomes unable to be supplied to the optical communication module due to occurrence of an abnormality to the host substrate itself or when the host substrate is removed from an optical communication apparatus. Namely, according to the technique disclosed in PTD 1, adequate consideration is not given to the situation of the failure of the optical communication module or the situation in which only the optical communication module which has failed is returned.

For the aforementioned reasons, according to the conventional techniques, when only the optical communication module which has failed is returned to the technical expert of the manufacturer, the technical expert of the manufacturer was not able to know the state of the optical communication module and the state of the host substrate immediately before the optical communication module fails.

An object of the present invention is to, when an abnormality occurs in a host substrate, allow not only information about an optical communication module mounted on the host substrate but also information about the host substrate to be left in the optical communication module.

Solution to Problem

An optical communication module according to an aspect of the present invention is an optical communication module insertable in and removable from a host substrate, including: a control unit; and a nonvolatile memory. The control unit monitors the optical communication module and repeatedly receives log information about a state of the host substrate from the host substrate. When a hazard signal indicating an abnormality of the host substrate is detected, the control unit writes, in the nonvolatile memory, a result of monitoring of the optical communication module and the log information from the host substrate.

Owing to the above-described features, when the abnormality occurs in the host substrate, not only the information about the optical communication module mounted on the host substrate but also the information about the host substrate can be left in the optical communication module. The aforementioned information is stored in the nonvolatile memory. Therefore, even when power supply to the optical communication module becomes abnormal due to, for example, the abnormality that has occurred in the host substrate, the information about the state of the host substrate and the state of the optical communication module immediately before the occurrence of the abnormality can be left in the optical communication module. The abnormality of the host substrate indicated by the hazard signal includes, for example, an abnormality relating to power supply from the host substrate to the optical communication module, although it is not limited thereto. "Optical communication module" may have both the transmission and reception capabilities like the optical transceiver, or have only one of the transmission and reception capabilities (like optical receiver or optical transmitter for example).

Preferably, the optical communication module further includes a power supply monitoring unit. The power supply monitoring unit outputs the hazard signal when an abnormality relating to power supply from the host substrate to the optical communication module is detected. The abnormality relating to the power supply includes a case in which a power supply voltage supplied from the host substrate during operation of the optical communication module falls outside a prescribed range.

Owing to the above-described features, the hazard signal is output in response to detection of the abnormality relating to the power supply. As a result, the optical communication module writes, in the nonvolatile memory, a result of self-monitoring and the log information from the host substrate. Therefore, such a possibility can be increased that the information about the state of the host substrate and the state of the optical communication module is stored in the nonvolatile memory before the optical communication module stops finally due to the abnormality relating to the power supply. The abnormality relating to the power supply includes the case in which the power supply voltage supplied from the host substrate during operation of the optical communication module falls outside the prescribed range, although it is not limited thereto.

Preferably, the optical communication module further includes a volatile memory. When the hazard signal is not detected, the control unit writes, in the volatile memory, the result of monitoring of the optical communication module and the log information from the host substrate, and then, when the hazard signal is detected, the control unit transfers, from the volatile memory to the nonvolatile memory, the result of monitoring of the optical communication module and the log information from the host substrate.

Owing to the above-described features, when the hazard signal is not detected, i.e., when the host substrate is normal, the information is written in the volatile memory. Therefore, the information can be left in the volatile memory. Only after the hazard signal is detected, the result of monitoring of the optical communication module and the log information from the host substrate are written in the nonvolatile memory. As a result, frequent writing in the nonvolatile memory can be prevented. Therefore, a considerable reduction of the number of times the nonvolatile memory is permitted to be written can be prevented. The lifetime of the nonvolatile memory is prevented from being considerably shortened, and accordingly shortening of the lifetime of the optical communication module depending on the lifetime of the nonvolatile memory can be prevented.

Preferably, when receiving the log information from the host substrate, the control unit writes the result of monitoring of the optical communication module in the volatile memory, together with the received log information.

Owing to the above-described features, a time lag between the log information from the host substrate and the result of monitoring of the optical communication module can be reduced. Therefore, for example, when the optical communication module which has failed is returned to a technical expert of the manufacturer, the technical expert can analyze the cause of the failure of the optical communication module in detail by checking the state of the host substrate indicated by the log information from the host substrate and the state of the optical communication module indicated by the result of monitoring of the optical communication module.

A method for recording a log of an optical communication module according to another aspect of the present invention includes the steps of: causing an optical communication module insertable in and removable from a host substrate to perform self-monitoring; causing the optical communication module to receive log information about a state of the host substrate from the host substrate; and writing, in a nonvolatile memory mounted on the optical communication module, a result of the self-monitoring by the optical communication module and the log information received by the optical communication module, when an abnormality relating to power supply from the host substrate to the optical communication module is detected.

Owing to the above-described features, when the abnormality relating to the power supply from the host substrate to the optical communication module occurs, not only the information about the optical communication module mounted on the host substrate but also the information about the host substrate can be left in the optical communication module. The abnormality relating to the power supply includes, for example, the case in which the power supply voltage supplied from the host substrate to the optical communication module falls outside the prescribed range. For example, when the power supply voltage during operation of the optical communication module falls outside the prescribed range, it is detected as the abnormality relating to the power supply from the host substrate. The case in which the power supply voltage falls outside the prescribed range includes, for example, a case in which the power supply voltage falls below a determination level when the power supply voltage is positive.

An optical communication apparatus according to still another aspect of the present invention includes: a host substrate; and a plurality of optical communication modules. Each of the plurality of optical communication modules is insertable in and removable from the host substrate and includes a nonvolatile memory. Each of the plurality of optical communication modules performs self-monitoring and repeatedly receives log information about a state of the host substrate from the host substrate. When an abnormality relating to power supply from the host substrate to the optical communication modules occurs, each of the plurality of optical communication modules writes, in the nonvolatile memory, a result of the self-monitoring and the log information from the host substrate. The host substrate transmits the log information to the plurality of optical communication modules at different timings.

Owing to the above-described features, when the abnormality relating to the power supply from the host substrate to the optical communication modules occurs, not only the information about the optical communication module mounted on the host substrate but also the information about the host substrate can be left in the optical communication module. Furthermore, the log information is sent to the plurality of optical communication modules at different timings. Therefore, the log information generated at different times is held in the plurality of optical communication modules. When a plurality of optical communication modules fail, a temporal change in the state of the host substrate (conversely, it may be no change in the state of the host substrate) can be known by analyzing the log information stored in these optical communication modules which have failed. Therefore, the cause of the failure of the optical communication modules can be analyzed in more detail. "Abnormality relating to power supply" is defined similarly to the aforementioned definition.

Preferably, the optical communication apparatus further includes a power supply switching unit in the optical communication apparatus. When the abnormality relating to the power supply from the host substrate is detected, the power supply switching unit supplies power to the optical communication modules in place of the host substrate, at least until writing in the nonvolatile memory is completed.

Owing to the above-described features, the power supply switching unit can ensure the operation of each of the plurality of optical communication modules to write, in the nonvolatile memory, the result of self-monitoring and the log information from the host substrate. Therefore, the result of self-monitoring by the optical communication modules and the log information from the host substrate can be left in the optical communication modules more reliably. The power supply switching unit may at least supply, to the optical communication modules, the power supply voltage required for the operation of writing in the nonvolatile memory. Therefore, the power supply voltage supplied to the optical communication modules by the power supply switching unit is not limited to be the same as the power supply voltage supplied from the host substrate before the host substrate becomes abnormal.

Advantageous Effects of Invention

According to the present invention, when the abnormality occurs in the host substrate, not only the information about the optical communication module mounted on the host substrate but also the information about the host substrate can be left in the optical communication module.

BRIEF DESCRIPTION OF DRAWINGS

FIG. 5 is a block diagram showing a configuration of a controller 20 shown in
FIG. 2.

FIG. 6 is a diagram illustrating an example configuration of log information stored in a nonvolatile memory 22 shown in FIG. 5.

FIG. 9 is a diagram showing candidate examples of monitor values for the optical transceiver and types of abnormalities that can be known from the monitor values.

DESCRIPTION OF EMBODIMENTS

Figure 1:
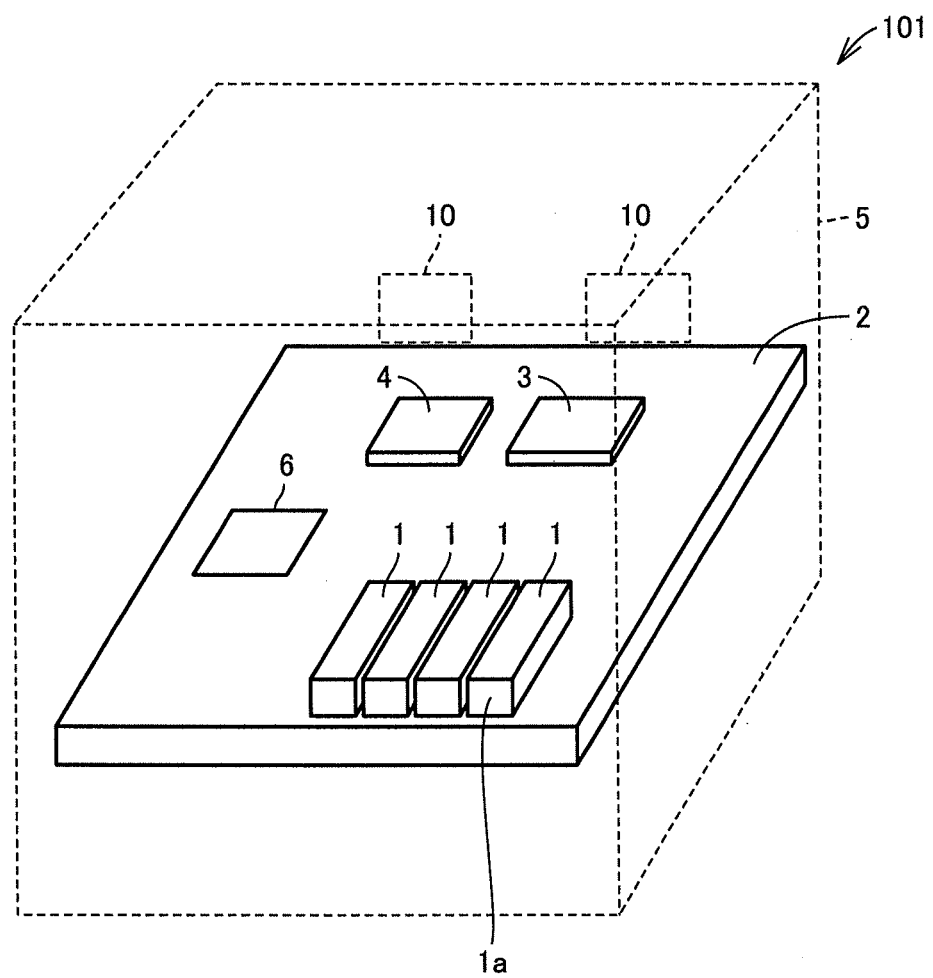
FIG. 1 is a schematic configuration diagram of an optical communication apparatus in an embodiment of the present invention.

In the following, embodiments of the present invention will be described in detail with reference to the drawings. In the drawings, the same or corresponding components are denoted by the same reference characters, and a description thereof will not be repeated.

FIG. 1 is a schematic configuration diagram of an optical communication apparatus in an embodiment of the present invention. Referring to FIG. 1, optical communication apparatus 101 includes a plurality of optical transceivers 1, a host substrate 2, a casing 5, and a fan 10. Optical transceivers 1 are shown in FIG. 1 as one specific form of the optical communication module of the present invention.

A plurality of optical transceivers 1 are mounted on host substrate 2. A plurality of optical transceivers 1 are pluggable optical transceivers. Namely, optical transceiver 1 is configured to be insertable in and removable from host substrate 2.

Optical transceiver 1 converts an electrical signal sent from host substrate 2 into an optical signal and outputs the optical signal to an optical network. Optical transceiver 1 also converts an optical signal sent through the optical network into an electrical signal and sends the electrical signal to host substrate 2. A front face 1a of optical transceiver 1 is configured so that a connector (not shown) provided at an end of an optical communication cable is attachable to and detachable from front face 1a of optical transceiver 1, which, however, is not shown in detail in FIG. 1.

Host substrate 2 is installed in casing 5. Casing 5 may for example be a rack. The direction in which host substrate 2 is oriented is not particularly limited. FIG. 1 shows, for the sake of ease of recognition of a plurality of optical transceivers 1 and host substrate 2, an arrangement where the surface of host substrate 2 is parallel to the horizontal direction. Host substrate 2 may be arranged in the manner shown in FIG. 1. Alternatively, host substrate 2 may be arranged upright (host substrate 2 is placed to stand in the vertical direction). In addition, one host substrate 2 or a plurality of host substrates 2 may be mounted on optical communication apparatus 101.

Host substrate 2 is mounted with a host CPU (Central Processing Unit) 3 and a nonvolatile memory 4. Host CPU 3 and nonvolatile memory 4 are shown as typical devices mounted on host substrate 2.

Host CPU 3 communicates with each of a plurality of optical transceivers 1. Host CPU 3 further generates log information concerning monitoring of the situation of host substrate 2 by host CPU 3. The log information is stored in nonvolatile memory 4. The log information stored in nonvolatile memory 4 includes, for example, information about a time when host CPU 3 monitored the situation of host substrate 2, and information about the situation of host substrate 2 at that time.

Nonvolatile memory 4 is a memory in which information can be written and the information can be stored in a nonvolatile manner. Nonvolatile memory 4 is implemented for example by an EEPROM. Host CPU 3 and nonvolatile memory 4 may be integrated into one unit.

To each of the plurality of optical transceivers 1, a power supply switching circuit 6 supplies a power supply voltage supplied from host substrate 2. The power supply voltage is supplied to host substrate 2 from outside host substrate 2. An example configuration of power supply switching circuit 6 will be described below.

When host substrate 2 is powered down, power supply switching circuit 6 supplies prestored electric power to each of the plurality of optical transceivers 1. Namely, power supply switching circuit 6 has a capability as a backup power source for the plurality of optical transceivers 1. Power supply switching circuit 6 outputs a hazard signal indicating an abnormality relating to power supply from host substrate 2.

In the present embodiment, as one example of the abnormality relating to power supply from host substrate 2, an abnormality that the power supply voltage supplied from host substrate 2 to optical transceivers 1 during operation of optical transceivers 1 decreases is described. "Abnormality that the power supply voltage decreases" specifically means that the power supply voltage supplied from host substrate 2 to each of optical transceivers 1 falls below a determination level. The determination level may be appropriately set depending on specifications of host substrate 2 and optical transceivers 1. For example, when the normal power supply voltage of optical transceiver 1 is set within the range of 3.3 V±5%, the determination level is set to be, for example, 3 V (this value is only an example provided for understanding of the present embodiment and the determination level is not limited to this value). It is to be noted that "abnormality that the power supply voltage decreases" may be expressed hereinafter as "host substrate 2 is powered down".

In addition, when an abnormality occurs in host substrate 2, the power supply voltage supplied from host substrate 2 to each of the plurality of optical transceivers 1 is considered to instantaneously decrease from the normal voltage (e.g., 3.3 V described above) to 0 V in many cases. However, the aforementioned abnormality that "host substrate 2 is powered down" includes a situation in which the power supply voltage falls below the determination level, and does not limit the speed of decrease in the power supply voltage. In addition, the final value of the power supply voltage when the power supply voltage falls below the determination level is not limited to 0 V.

Specific examples of occurrence of the abnormality that "host substrate 2 is powered down" include a case in which supply of the power supply voltage to host substrate 2 becomes impossible due to failure of optical communication apparatus 101 as a whole. The specific examples also include a case in which supply of the power supply voltage to host substrate 2 is interrupted due to, for example, abnormal increase in temperature of host substrate 2. The specific examples are not, however, limited to these examples and other examples can also be assumed.

When host substrate 2 is powered down, each optical transceiver 1 receives the hazard signal indicating this abnormality. As a result, each optical transceiver 1 records log information about the state of optical transceiver 1 itself and log information about host substrate 2 in optical transceiver 1 in a nonvolatile manner. This process will be described in detail below.

Fan 10 releases heat generated at host substrate 2 to outside optical communication apparatus 101. According to the configuration shown in FIG. 1, fan 10 is provided on a rear face of casing 5. Fan 10 operates, and thereby, external air is introduced from a front face of optical communication apparatus 101 into optical communication apparatus 101, and heat generated at host substrate 2 is released from the rear face of optical communication apparatus 101 to the outside. Fan 10 is not limited to being provided on the rear face of casing 5. Fan 10 may be provided on an arbitrary surface (such as an upper surface, a lower surface, the front face, and a side surface) of casing 5, or may be provided on host substrate 2.

Figure 2:
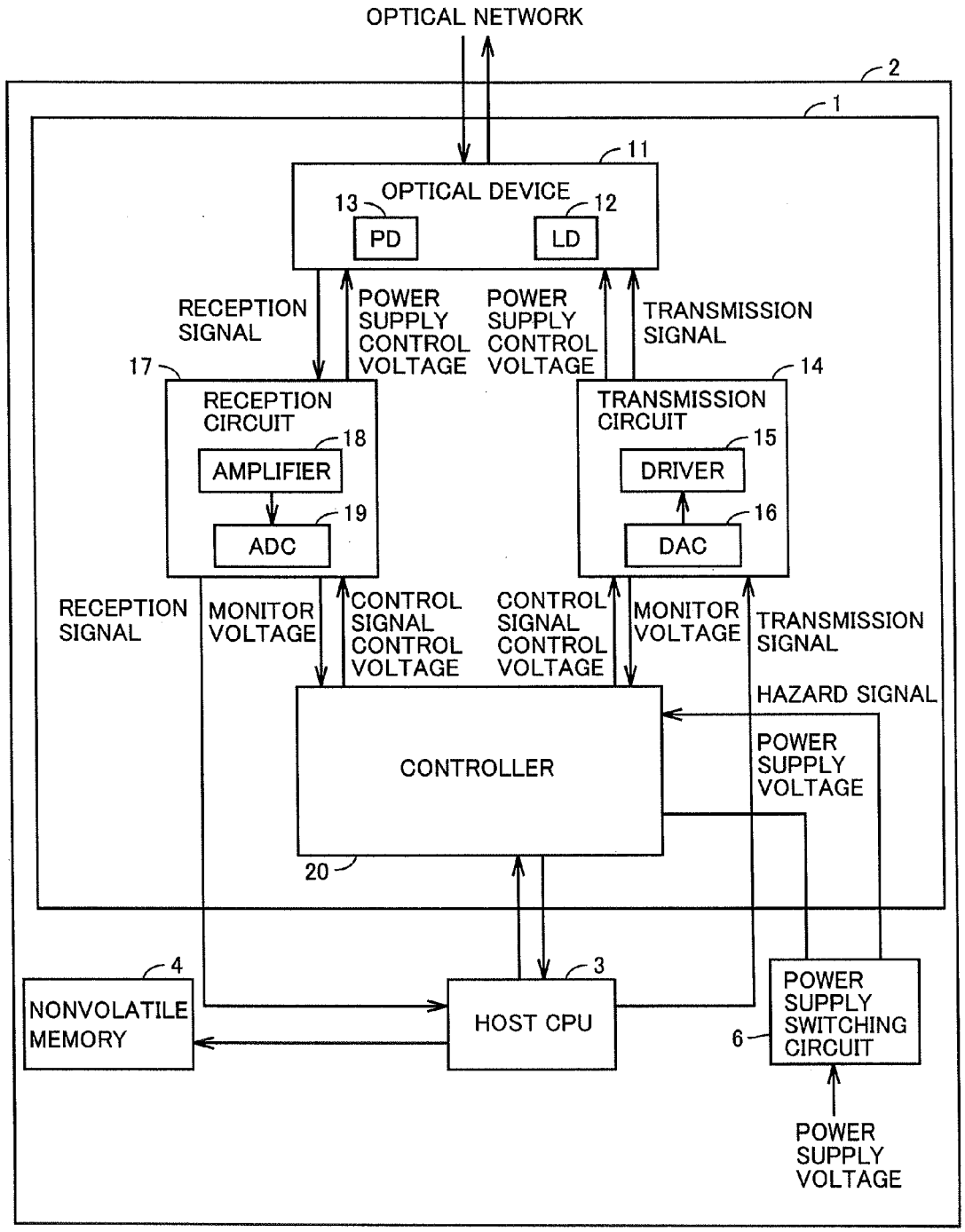
FIG. 2 is a block diagram showing an example configuration of an optical transceiver 1 shown in FIG. 1.

FIG. 2 is a block diagram showing an example configuration of optical transceiver 1 shown in FIG. 1. Referring to FIG. 2, optical transceiver 1 includes an optical device 11, a transmission circuit 14, a reception circuit 17, and a controller 20.

Optical device 11 includes a laser diode (LD) 12 and a photodiode (PD) 13. Laser diode 12 receives a power supply voltage and a control voltage that are fed from transmission circuit 14. Laser diode 12 converts an electrical signal (transmission signal) which is sent from transmission circuit 14 into an optical signal and outputs the optical signal through an optical cable (not shown) to the optical network.

Photodiode 13 receives a power supply voltage and a control voltage that are fed from reception circuit 17. Photodiode 13 receives an optical signal through an optical cable (not shown) from the optical network and converts the optical signal into an electrical signal. Photodiode 13 outputs the electrical signal as a reception signal to reception circuit 17.

Transmission circuit 14 includes a driver 15 for feeding the power supply voltage and the control voltage to laser diode 12. Transmission circuit 14 further includes a D/A converter (DAC) 16. D/A converter 16 converts a digital transmission signal which is sent from host CPU 3 into an analog signal. Driver 15 applies the analog signal to laser diode 12. Further, transmission circuit 14 outputs to controller 20 a monitor voltage indicating a state of transmission circuit 14 or laser diode 12. This monitor voltage is for example a voltage representing the intensity of light which is output by laser diode 12.

Reception circuit 17 feeds the power supply voltage and the control voltage to photodiode 13. Reception circuit 17 includes an amplifier 18 and an A/D converter (ADC) 19. Amplifier 18 amplifies the reception signal (analog signal) which is sent from photodiode 13. A/D converter 19 converts the amplified analog signal into a digital signal. Reception circuit 17 outputs this digital signal to host CPU 3. Further, reception circuit 17 outputs to controller 20 a monitor voltage indicating a state of reception circuit 17 or photodiode 13. This monitor voltage is for example a voltage representing the intensity of light which is received by photodiode 13.

Controller 20 performs centralized control of optical transceiver 1. For this sake, controller 20 supplies a control signal and a control voltage to each of transmission circuit 14 and reception circuit 17. Further, based on the monitor voltage from each of transmission circuit 14 and reception circuit 17, controller 20 monitors the state of optical transceiver 1. Furthermore, in response to a request from host CPU 3, controller 20 transmits to host CPU 3 information about the state of optical transceiver 1.

Furthermore, controller 20 repeatedly receives log information sent from host CPU 3. Controller 20 temporarily holds the log information. Controller 20 may receive the log information on a regular basis (e.g., at intervals of one second), or may receive the log information on an irregular basis.

Controller 20 receives the power supply voltage from power supply switching circuit 6. Furthermore, when host substrate 2 is powered down, controller 20 receives the hazard signal. In response to the hazard signal, controller 20 stores the log information about host substrate 2 and the log information about the state of optical transceiver 1 in a nonvolatile manner.

Figure 3:
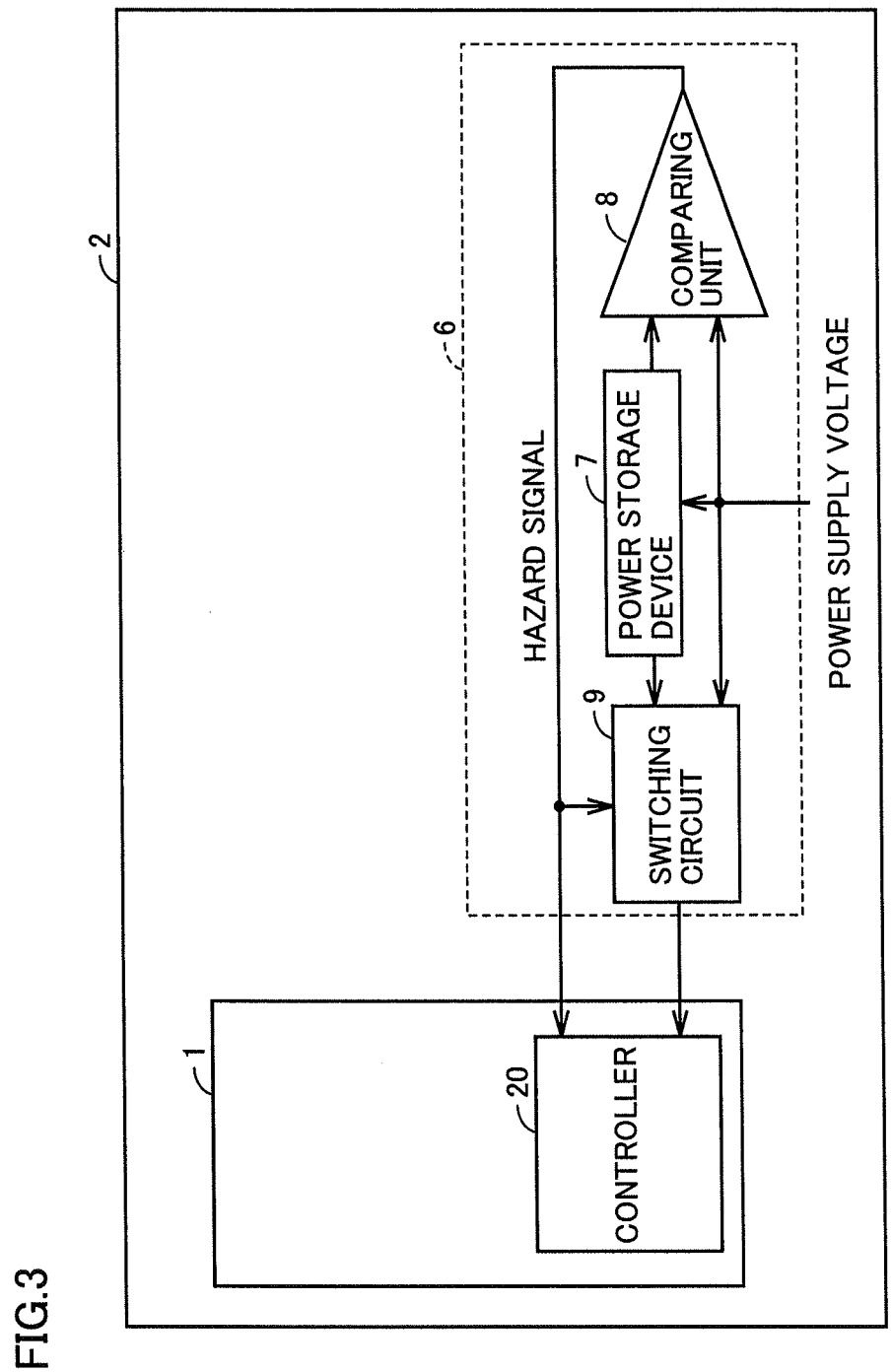
FIG. 3 is a functional block diagram of a power supply switching circuit 6 shown in FIGS. 1 and 2.

FIG. 3 is a functional block diagram of power supply switching circuit 6 shown in FIGS. 1 and 2. Referring to FIG. 3, power supply switching circuit 6 includes a power storage device 7, a comparing unit 8 and a switching circuit 9.

In the present embodiment, power storage device 7 is implemented by a device configured to be charged and discharged, such as, for example, a secondary battery and a capacitor. Power storage device 7 is charged with the power supply voltage supplied from host substrate 2. When host substrate 2 is powered down, power storage device 7 emits the stored electric power. The capacity of power storage device 7 is set such that power supply to the plurality of optical transceivers 1 is possible at least until the end of an operation of each of the plurality of optical transceivers 1 to write a result of self-monitoring and the log information from the host substrate in a nonvolatile memory included in optical transceiver 1.

Comparing unit 8 is a circuit for detecting decrease in the power supply voltage from host substrate 2. When the power supply voltage from host substrate 2 falls below the determination level, comparing unit 8 outputs the hazard signal. The hazard signal is sent to switching circuit 9 and controller 20 of optical transceiver 1. Namely, comparing unit 8 functions as a power supply monitoring unit for monitoring the power supply voltage from host substrate 2.

When receiving the hazard signal, switching circuit 9 supplies the voltage of power storage device 7 to optical transceiver 1. When not receiving the hazard signal, switching circuit 9 supplies the power supply voltage from host substrate 2 to optical transceiver 1.

Figure 4:
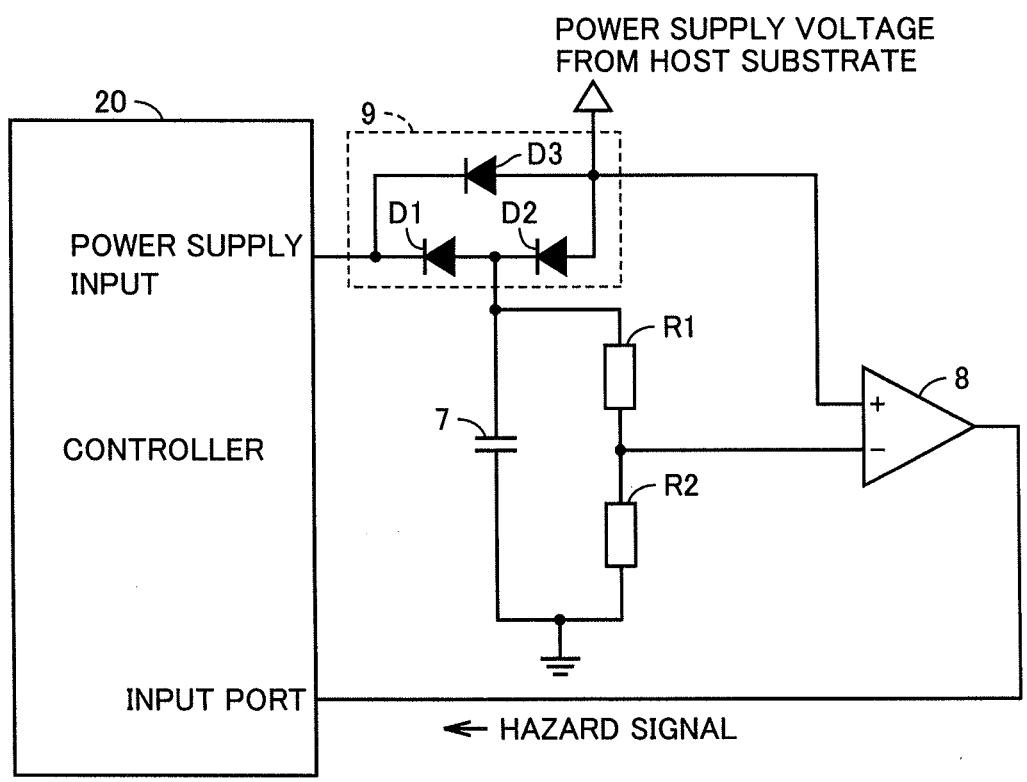
FIG. 4 is a diagram showing one specific example configuration of power supply switching circuit 6 shown in FIG. 3.

FIG. 4 is a diagram showing one specific example configuration of power supply switching circuit 6 shown in FIG. 3. Referring to FIG. 4, resistance elements R1 and R2 divide the voltage of power storage device 7 and generate a reference voltage corresponding to the determination level.

Comparing unit 8 compares the reference voltage generated as described above and the power supply voltage from the host substrate. In the normal case, i.e., when the host substrate is not powered down, the voltage of power storage device 7 is equal to the power supply voltage from host substrate 2. Therefore, the power supply voltage from host substrate 2 is higher than the reference voltage. In this case, comparing unit 8 does not output the hazard signal. On the other hand, when the power supply voltage from the host substrate is lower than the reference voltage, comparing unit 8 outputs the hazard signal. The hazard signal is input to an input port of controller 20.

The power supply voltage for operating comparing unit 8 is, for example, supplied from the host substrate. For example, "output the hazard signal" refers to a state in which the hazard signal is in the L (low) level, and "not output the hazard signal" refers to a state in which the hazard signal is in the H (high) level. According to this configuration, since the power supply voltage from the host substrate is normally higher than the reference voltage, the hazard signal is in the H level. Namely, the hazard signal is not output from comparing unit 8. On the other hand, when the power supply voltage from the host substrate becomes lower than the normal level, the hazard signal enters the L level. Namely, the hazard signal is output from comparing unit 8. When host substrate 2 is powered down, supply of the power supply voltage from host substrate 2 to comparing unit 8 is considered to be impossible. In this case as well, the hazard signal enters the L level. Namely, the hazard signal is output from comparing unit 8. With the aforementioned configuration, the hazard signal can be output from comparing unit 8 when host substrate 2 is powered down.

Switching circuit 9 is formed of diodes D1 to D3. Diode D1 is arranged to allow the current to flow from power storage device 7 to a power supply input terminal of controller 20. Diode D2 is arranged to allow the current to flow from host substrate 2 to power storage device 7. Diode D3 is arranged to allow the current to flow from host substrate 2 to the power supply input terminal of controller 20.

Normally, diode D3 allows the current to flow from host substrate 2 to the power supply input terminal of controller 20. Furthermore, diode D2 allows the current to flow from host substrate 2 to the power supply input terminal of controller 20, and power storage device 7 is charged. On the other hand, when the power supply voltage from host substrate 2 decreases, supply of the power supply voltage from host substrate 2 to controller 20 is interrupted by diode D3. Furthermore, by diode D1, the power supply voltage is supplied from power storage device 7 to controller 20.

According to the configuration shown in FIG. 4, the power supply voltage supplied from power storage device 7 is substantially equal to the power supply voltage supplied from host substrate 2 to optical transceiver 1 before host substrate 2 is powered down. However, the power supply voltage supplied from power storage device 7 does not necessarily need to be the same as the power supply voltage supplied from host substrate 2 to optical transceiver 1. The power supply voltage supplied from power storage device 7 may at least fall within a range predetermined as the power supply voltage of optical transceiver 1.

In addition, any power storage device may be used as power storage device 7 as long as it can supply the power to optical transceiver 1 when power supply from host substrate 2 is abnormal (particularly when the power supply voltage from host substrate 2 falls below the determination level during operation of optical transceiver 1). Therefore, power storage device 7 is not limited to a power storage device such as a secondary battery that can be both charged and discharged, and a primary battery may be used. The voltage of the primary battery may at least fall within a range predetermined as the power supply voltage of optical transceiver 1, and does not necessarily need to be the same as the power supply voltage supplied from host substrate 2 to optical transceiver 1.

In addition, according to the structure shown in FIGS. 3 and 4, power supply switching circuit 6 is mounted on host substrate 2 separately from optical transceiver 1. However, a part or all of the components of power supply switching circuit 6 may be built into optical transceiver 1. According to one embodiment, comparing unit 8 serving as the power supply monitoring unit may be built into optical transceiver 1. According to this configuration, optical transceiver 1 has a capability of monitoring the power supply voltage, and thus, optical transceiver 1 can be highly functionalized. Power supply switching circuit 6 is not limited to being provided within optical transceiver 1 or on host substrate 2, and may at least be provided somewhere in optical communication apparatus 101.

FIG. 5 is a block diagram showing a configuration of controller 20 shown in FIG. 2. The configuration shown in FIG. 5 can be implemented by either a plurality of semiconductor integrated circuits or a single semiconductor integrated circuit.

Referring to FIG. 5, controller 20 includes a control unit 21, a nonvolatile memory 22, a volatile memory 23, a bus 24, an A/D converter 25, a D/A converter 26, a data bus interface 27, a logic port 28, a data bus interface 29, and a temperature sensor 30.

Control unit 21 controls the operation of the whole of controller 20. Nonvolatile memory 22 is a memory in which information can be written and from which information can be read and further the information written therein can be stored in a nonvolatile manner. "Store in a nonvolatile manner" means that nonvolatile memory 22 can still hold the information even while no power supply voltage is fed thereto. Nonvolatile memory 22 is implemented for example by an EEPROM.

Regarding volatile memory 23, information can be written and read in and from the volatile memory. When the power supply voltage is stopped from being fed to volatile memory 23, the information stored in volatile memory 23 is lost. Volatile memory 23 is implemented for example by a DRAM (Dynamic Random Access Memory) or SRAM (Static Random Access Memory) or the like.

Bus 24 is provided for transmitting information for example between control unit 21 and nonvolatile memory 22 or between control unit 21 and volatile memory 23.

A/D converter 25 converts a monitor voltage which is sent from transmission circuit 14 or reception circuit 17 shown in FIG. 2 for example into a digital signal. A/D converter 25 outputs this digital signal to control unit 21. D/A converter 26 converts a digital control signal which is sent from control unit 21 for example into an analog control signal. D/A converter 26 outputs this analog control signal to transmission circuit 14 or reception circuit 17 shown in FIG. 2.

Data bus interface 27 is a circuit for transmitting and receiving data for example between transmission circuit 14 or reception circuit 17 shown in FIG. 2 and control unit 21. Logic port 28 is a circuit for control unit 21 for example to transmit a digital control signal to transmission circuit 14 or reception circuit 17. Data bus interface 27 is a circuit for transmission and reception of data between transmission circuit 14 or reception circuit 17 shown in FIG. 2 and control unit 21, for example. Data bus interface 29 is a circuit for control unit 21 for example to transmit and receive data to and from host CPU 3 or another device (another optical transceiver for example) mounted on host substrate 2.

Control unit 21 receives the log information from the host substrate via data bus interface 29. Alternatively, in response to a request from host substrate 2 (host CPU 3), control unit 21 outputs the log information stored in volatile memory 23 to data bus interface 29.

Temperature sensor 30 detects the temperature of optical transceiver 1 and outputs a signal representing the temperature to control unit 21. Since temperature sensor 30 may at least be disposed inside optical transceiver 1, temperature sensor 30 may be provided separately from controller 20.

Control unit 21 repeatedly monitors the state of optical transceiver 1. Namely, control unit 21 achieves a self-monitoring capability of optical transceiver 1. Furthermore, when the log information is sent from host substrate 2 to optical transceiver 1, control unit 21 adds information about monitoring of the state of optical transceiver 1 to the log information from host substrate 2 and writes these log information in volatile memory 23.

The hazard signal is input to control unit 21 via, for example, logic port 28. When control unit 21 receives the hazard signal, control unit 21 stops the normal routine process and transfers the log information stored in volatile memory 23 to nonvolatile memory 22. Namely, control unit 21 reads the log information from volatile memory 23 and writes the log information in nonvolatile memory 22. As described above, the power supply voltage for the operation of control unit 21, volatile memory 23 and nonvolatile memory 22 at this time is supplied by power storage device 7 (see FIGS. 3 and 4) included in power supply switching circuit 6.

As a result of the aforementioned operation, nonvolatile memory 22 stores, in a nonvolatile manner, the log information about the state of optical transceiver 1 and the state of host substrate 2 immediately before host substrate 2 is powered down. Log information 42 shown in FIG. 5 represents the log information stored in nonvolatile memory 22.

FIG. 6 is a diagram illustrating an example configuration of the log information stored in nonvolatile memory 22 shown in FIG. 5. Referring to FIGS. 5 and 6, log information 42 includes an optical transceiver status 42a (hereinafter simply referred to as "status 42a"), alarm information 42b, temperature monitor information 42c, time information 42d, and a host substrate log 42e.

An address A1 is allocated to status 42a. An address A2 is allocated to alarm information 42b. An address A3 is allocated to temperature monitor information 42c. An address A4 is allocated to time information 42d. An address A5 is allocated to host substrate log 42e. Addresses A1 to A5 are determined depending on sizes of the respective items of log information 42.

Status 42a is a code representing a state of optical transceiver 1 when control unit 21 monitors the optical transceiver. Alarm information 42b is information indicating the fact that an abnormality of optical transceiver 1 has occurred. For example, in the case where the temperature of optical transceiver 1 has exceeded a reference value, a flag ("1" for example) representing this fact is generated as alarm information 42b. Temperature monitor information 42c is information indicating the temperature of optical transceiver 1 when the temperature thereof exceeds the reference value. Based on the output of temperature sensor 30, control unit 21 generates a value of the measured temperature, and includes, in the log information, the value of the measured temperature as temperature monitor information 42c.

Time information 42d is time information provided from the host substrate. This time may be, for example, a time when host substrate 2 (host CPU 3) generates the log information, or may be a time when host CPU 3 monitors host substrate 2.

Host substrate log 42e is log information sent from host substrate 2. Host substrate log 42e includes, for example, information about the temperature of host substrate 2. In addition to or instead of the information about the temperature of host substrate 2, another information may be included in host substrate log 42e. Examples of such "another information" include, for example, information indicating whether fan 10 (see FIG. 1) is normal or not. The information included in host substrate log 42e is not limited thereto and may include other information about host substrate 2.

Log information 42 shown in FIG. 6 is temporarily stored in volatile memory 23. Control unit 21 may temporarily store time information 42d and host substrate log 42e sent from host substrate 2 in volatile memory 23, and may generate and write status 42a, alarm information 42b and temperature monitor information 42c in nonvolatile memory 22 when control unit 21 writes time information 42d and host substrate log 42e in nonvolatile memory 22.

Furthermore, a plurality of pieces of log information 42 may be stored in volatile memory 23. Each of the pieces of log information 42 has the configuration shown in FIG. 6. In response to reception of the hazard signal, control unit 21 collectively transfers the plurality of pieces of log information 42 to nonvolatile memory 22.

Figure 7:
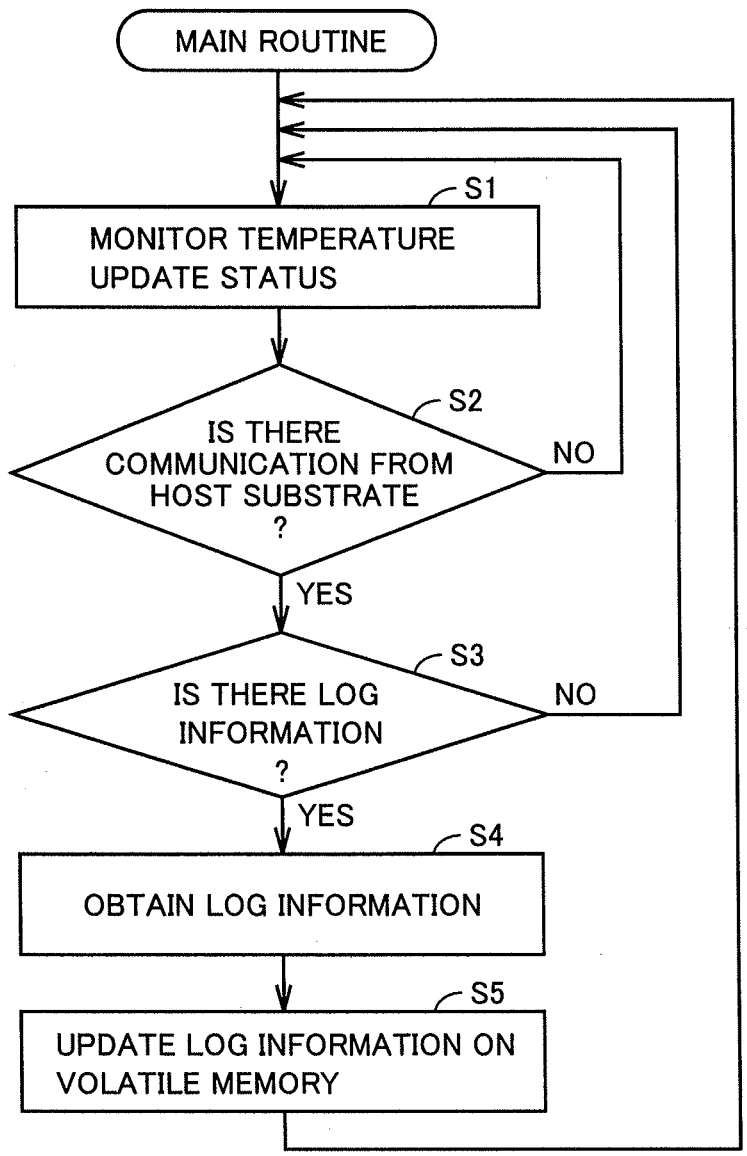
FIG. 7 is a flowchart showing one process at the time of normal operation of the optical transceiver in the embodiment of the present invention.

FIG. 7 is a flowchart showing one process at the time of normal operation of the optical transceiver in the embodiment of the present invention. Referring to FIG. 7, the process of the main routine is started. In step S1, control unit 21 receives a measurement value of temperature sensor 30 to thereby monitor the temperature of optical transceiver 1. Further, in step S1, control unit 21 updates a status (corresponding to status 42a). For example, control unit 21 holds the status in control unit 21 and updates the status. Step S1 corresponds to a step for optical transceiver 1 to perform self-monitoring.

In step S2, control unit 21 determines whether there is communication from host substrate 2 or not. For example, when a transmission request or a reception request is sent from host substrate 2 to control unit 21, control unit 21 determines that there is communication from the host substrate. If there is communication from host substrate 2 (YES in step S2), the process proceeds to step S3. If there is no communication from host substrate 2 (NO in step S2), the process is returned to step S1. That is, if there is no communication from host substrate 2, the process in steps S1 and S2 is repeated.

In step S3, control unit 21 determines whether there is log information from host substrate 2 or not. When host substrate 2 sends the log information to control unit 21, control unit 21 determines that there is log information from host substrate 2. In this case (YES in step S3), the process proceeds to step S4. On the other hand, if the log information is not sent from host substrate 2 to control unit 21 although there is communication between control unit 21 and host substrate 2 (NO in step S3), the process is returned to step S1.

In step S4, control unit 21 obtains the log information from host substrate 2. In step S5, control unit 21 updates the log information (host substrate log) on volatile memory 23. Specifically, control unit 21 adds the information about monitoring of the state of optical transceiver 1 to the log information from host substrate 2, and writes this log information in volatile memory 23. The log information has the same configuration as the configuration shown in FIG. 6. After completion of the process in step S5, the process is returned to step S1.

Figure 8:
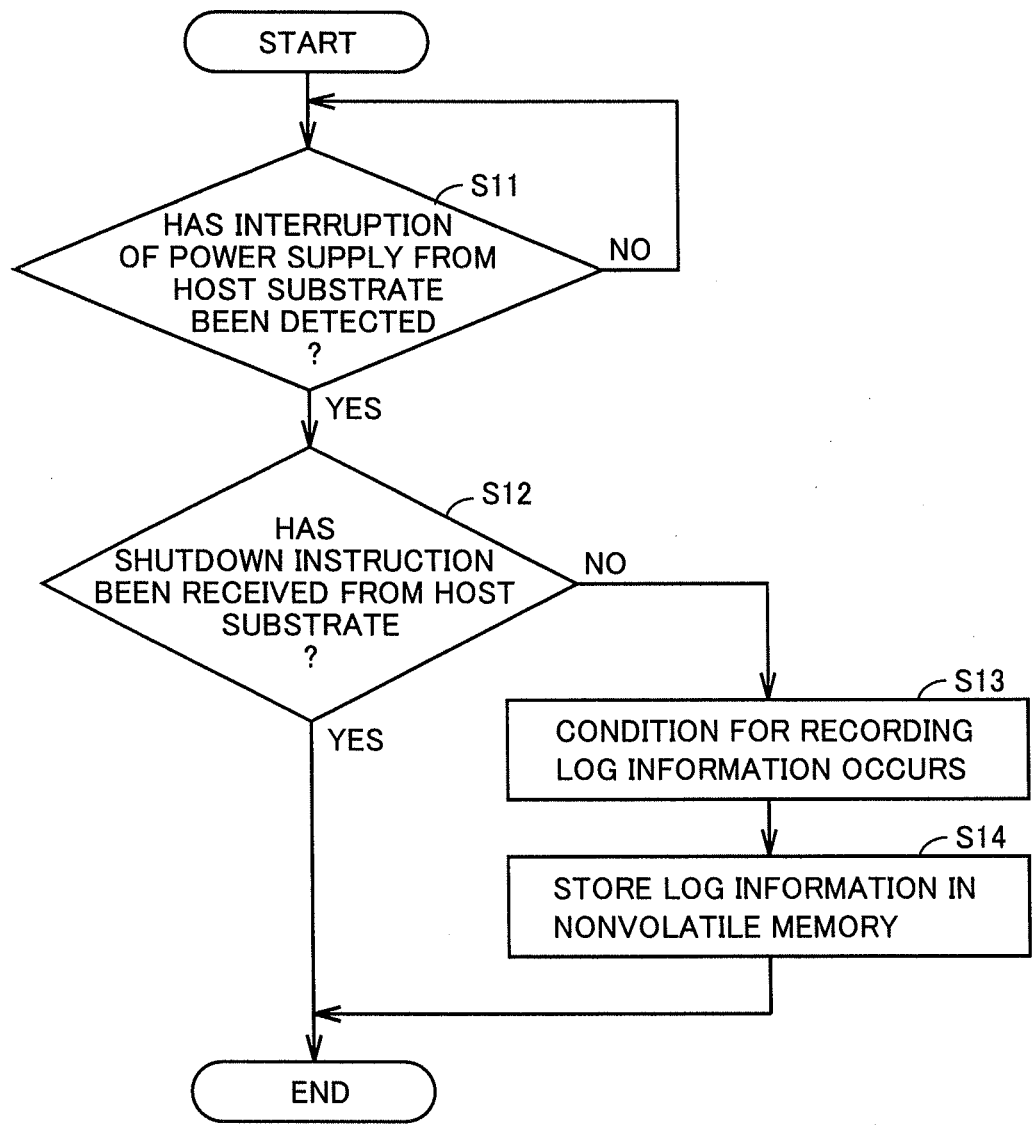
FIG. 8 is a flowchart showing a process of the optical transceiver when the host substrate is powered down.

FIG. 8 is a flowchart showing a process of the optical transceiver when the host substrate is powered down. Referring to FIG. 8, in step S11, control unit 21 determines whether interruption of power supply from host substrate 2 has been detected or not. Specifically, by detecting the hazard signal, control unit 21 detects interruption of power supply from host substrate 2 (i.e., power-down of host substrate 2). Detection of interruption of power supply from host substrate 2 may be executed by an interrupt process. Alternatively, by detecting a state change caused by polling, interruption of power supply from host substrate 2 may be detected. As a result of the process in step S11, the abnormality relating to power supply from host substrate 2 to optical transceiver 1 is detected.

In step S12, control unit 21 determines whether a shutdown instruction has been received from host substrate 2 or not. In order to achieve electric power saving in optical communication apparatus 101, for example, supply of the power supply voltage to optical transceiver 1 may be intermittently stopped in some cases. In such a case, optical transceiver 1 stops the operation thereof in response to the shutdown instruction from host substrate 2, for example.

If the shutdown instruction has been received from host substrate 2 (YES in step S12), the process shown in FIG. 8 is completed. On the other hand, if there is no shutdown instruction from host substrate 2 (NO in step S12), the process proceeds to step S13.

The fact that interruption of power supply from host substrate 2 has been detected although there is no shutdown instruction means that there is a high possibility that an abnormality has occurred in host substrate 2. Therefore, in step S13, control unit 21 determines that a condition for recording the log information has occurred. In step S14, control unit 21 transfers the log information stored in volatile memory 23 to nonvolatile memory 22, and writes the log information in nonvolatile memory 22. As a result, log information 42 (see FIG. 6) is stored in nonvolatile memory 22. After completion of the process in step S14, the overall process is completed.

Host substrate 2 may transfer the same log information to each of the plurality of optical transceivers 1 shown in FIG. 1. Normally, it cannot be predicted which of the plurality of optical transceivers 1 will fail. By storing the same log information in the plurality of optical transceivers 1, the probability of leaving the log information about host substrate 2 in optical transceiver 1 which has failed can be increased.

As an alternative method, host substrate 2 may transfer the log information to the plurality of optical transceivers 1 at shifted timings. For example, host substrate 2 may cyclically transfer the log information among the plurality of optical transceivers 1. Namely, when the number of optical transceivers 1 is N (N is an integer not smaller than 2), host substrate 2 transfers the log information to the first optical transceiver, the second optical transceiver, . . . the N-th optical transceiver, the first optical transceiver, the second optical transceiver, . . . in this order. In this case, the log information generated at different times is held in N optical transceivers 1. When a plurality of optical transceivers 1 fail, a temporal change in the state of host substrate 2 (conversely, it may be no change in the state of host substrate 2) can be known by analyzing the log information stored in these optical transceivers 1 which have failed. Therefore, the cause of the failure of the optical transceivers can be analyzed in more detail.

According to the present embodiment, the log information about the host substrate is repeatedly sent to optical transceiver 1 that is insertable in and removable from host substrate 2. Furthermore, optical transceiver 1 performs self-monitoring. Optical transceiver 1 (control unit 21 of controller 20) stores the log information about the host substrate and the result of self-monitoring by optical transceiver 1 in the volatile memory. When the hazard signal indicating the abnormality relating to power supply from host substrate 2 (that the power supply voltage supplied to optical transceiver 1 during operation of optical transceiver 1 becomes lower than the normal level) is detected, the log information and the result of self-monitoring by the optical transceiver stored in the volatile memory are written in nonvolatile memory 22.

In the case where a plurality of optical transceivers 1 are connected to host substrate 2 as shown in FIG. 1 and one of the plurality of optical transceivers 1 has failed, it is unnecessary to remove the whole host substrate 2 from optical communication apparatus 101 and thereby return the substrate, and only the optical transceiver 1 which has failed may be returned. Therefore, the burden on the provider of the optical communication system that is required for returning the optical transceiver 1 which has failed can be reduced.

Further, in the case where an abnormality occurs to optical communication, it can easily be determined whether the cause of the abnormality is an optical transceiver or a host apparatus (host substrate). For example, the provider of the optical communication replaces the optical transceiver which has failed with a new (normal) optical transceiver. If the optical communication accordingly recovers from the abnormality, it is easily determined that the cause of the abnormality is the optical transceiver.

Further, not only the information about the optical transceiver but also the information about the host substrate is stored in optical transceiver 1 in a nonvolatile manner. If the log information remains stored in volatile memory 23, the log information stored in volatile memory 23 is lost when host substrate 2 is powered down. According to the present embodiment, when detecting the hazard signal, control unit 21 transfers the log information stored in volatile memory 23 to nonvolatile memory 22. Therefore, when the optical transceiver fails due to the abnormality like power-down of host substrate 2, not only the information about the state of optical transceiver 1 immediately before the failure but also the log information about the state of the host substrate immediately before the abnormality can be taken out from optical transceiver 1 which has failed. As a result, the cause of the failure of optical transceiver 1 can be analyzed in detail.

It is assumed, for example, that the temperature of host substrate 2 increases excessively, which causes not only power-down of host substrate 2 but also the failure of the optical transceiver. According to the temperature monitor information included in the log information, a temperature value higher than normal is shown. For example, when the log information (host information log) includes information indicating an abnormality of fan 10 in addition to the information about the temperature of the host substrate, worsened heat release at host substrate 2 can be estimated to be the cause of the failure of optical transceiver 1.

Further, according to the present embodiment, power supply switching circuit 6 is provided in case the power supply voltage from host substrate 2 is powered down. Power supply switching circuit 6 can supply the power supply voltage to optical transceiver 1 until writing of the log information in nonvolatile memory 22 included in optical transceiver 1 is completed. Therefore, the log information about the state of the optical transceiver and the state of the host substrate can be stored in optical transceiver 1 in a nonvolatile manner.

In addition, the nonvolatile memory such as an EEPROM generally has a limitation in the write count. If the log information is frequently written in nonvolatile memory 22, the lifetime of nonvolatile memory 22 may be shortened. According to the present embodiment, the log information is temporarily stored in volatile memory 23. The log information is written in nonvolatile memory 22 only when the host substrate is powered down. As a result, the number of times the log information is written in nonvolatile memory 22 can be reduced. Therefore, shortening of the lifetime of optical transceiver 1 due to the lifetime of nonvolatile memory 22 can be prevented.

According to the aforementioned embodiment, in the optical transceiver, the temperature of the optical transceiver is monitored. However, various causes of the abnormality of optical transceiver 1 are conceivable. Therefore, in optical transceiver 1, other monitor values may be monitored in addition to or instead of the temperature monitor value. In this case, control unit 21 stores the monitored monitor value in volatile memory 23, and transfers the monitor value to nonvolatile memory 22 when host substrate 2 is powered down.

FIG. 9 is a diagram showing candidate examples of the monitor values for the optical transceiver and types of abnormalities that can be known from the monitor values. Referring to FIG. 9, the temperature of optical transceiver 1, the intensity of light output by laser diode 12, the intensity of light received by photodiode 13, and the power supply voltage supplied to optical transceiver 1 are considered as the monitor values. A method for monitoring the temperature of optical transceiver 1 is as described above, and thus, a detailed description will not be repeated below.

Monitoring of the intensity of light output by laser diode 12 and the intensity of light received by photodiode 13 is performed for example in the following manner. Transmission circuit 14 outputs to controller 20 a monitor voltage indicating the intensity of light output by laser diode 12. Reception circuit 17 outputs to controller 20 a monitor voltage indicating the intensity of light received by photodiode 13. Controller 20 performs, by means of A/D converter 25, an analog to digital conversion of the monitor voltage which is output from transmission circuit 14 and the monitor voltage which is output from reception circuit 17. A digital signal which is output from A/D converter 25 is a monitor value indicating the intensity of the output light or a monitor value indicating the intensity of the received light. Control unit 21 receives these monitor values. Thus, control unit 21 monitors the intensity of light output by laser diode 12 and the intensity of light received by photodiode 13.

When the temperature is high, the components (e.g., laser diode 12) of the optical transceiver may be damaged. In addition, the temperature of laser diode 12 is normally managed by, for example, a Peltier device and the like such that the intensity of the output light is constant. However, when a difference between the temperature of laser diode 12 and the temperature of its surroundings becomes too large, it becomes difficult to manage the temperature of laser diode 12 to be constant. Therefore, it becomes difficult to keep constant the intensity of light output by laser diode 12. Accordingly, the temperature may be monitored as described above.

In addition, excessively high intensity of the output light is not preferable from the viewpoint of, for example, safety (e.g., safety against human eyes). Conversely, when the intensity of the output light is lower than a lower limit value, there is a possibility that laser diode 12 has reached the end of its lifetime. Therefore, the intensity of the output light may be monitored.

A highly-sensitive photodiode is used in optical communication. When the intensity of an optical signal input to the photodiode for optical communication is too high, the photodiode may be damaged. Therefore, the intensity of the received light may be monitored.

The monitor values are not limited to the examples shown in FIG. 9, and the optical transceiver may monitor other items about the optical transceiver.

In the present embodiment, the abnormality relating to power supply from host substrate 2 has been described as the abnormality of host substrate 2. However, the types of abnormalities of the host substrate to be detected are not particularly limited. The present invention may at least be configured such that the hazard signal indicating the abnormality is transmitted to control unit 21.

In addition, in the present embodiment, the case in which the power supply voltage supplied from host substrate 2 to optical transceiver 1 during operation of the optical transceiver falls below the determination level has been described as one example of the abnormality relating to power supply from host substrate 2. However, the power supply voltage used for detection of the abnormality is not limited to the power supply voltage during operation of the optical transceiver.

In addition, not only the case in which the power supply voltage supplied from host substrate 2 to optical transceiver 1 falls below the determination level but also a case in which the power supply voltage exceeds an upper limit value in the predetermined range may be detected as the abnormality relating to power supply from host substrate 2. Namely, the abnormality detected as the abnormality relating to power supply from host substrate 2 may be an abnormality that the power supply voltage supplied to optical transceiver 1 falls outside the predetermined range.

Further, in the present embodiment, the case in which the power supply voltage to optical transceiver 1 is a positive voltage has been described. However, the abnormality that the power supply voltage supplied to optical transceiver 1 falls outside the predetermined range may only be detected, and thus, the power supply voltage to optical transceiver 1 may be a negative voltage.

Further, in the aforementioned embodiment, all of the plurality of optical transceivers shown in FIG. 1 have a capability of storing the log information in a nonvolatile manner. However, a part of the plurality of optical transceivers may have the log information storing capability described in the present embodiment and the remaining optical transceivers do not need to have the log information storing capability.

The optical transceiver has been illustrated herein as one specific form of the optical communication module according to the present invention. The optical communication module of the present invention, however, is not limited to the one like the optical transceiver having both the transmission capability and the reception capability. The optical communication module of the present invention may have only one of the transmission capability and the reception capability. Therefore, the optical communication module of the present invention may be an optical receiver or an optical transmitter.

It should be construed that the embodiments disclosed herein are by way of illustration in all respects, not by way of limitation. It is intended that the scope of the present invention is defined by claims and encompasses all modifications and variations equivalent in meaning and scope to the claims.

REFERENCE SIGNS LIST

1 optical transceiver; 1a front face (optical transceiver); 2 host substrate; 3 host CPU; 4, 22 nonvolatile memory; 5 casing; 6 power supply switching circuit; 7 power storage device; 8 comparing unit; 9 switching circuit; 11 optical device; 12 laser diode; 13 photodiode; 14 transmission circuit; 15 driver; 16, 26 D/A converter; 17 reception circuit; 18 amplifier; 19, 25 A/D converter; 20 controller; 21 control unit; 23 volatile memory; 24 bus; 27, 29 data bus interface; 28 logic port; 30 temperature sensor; 42 log information; 101 optical communication apparatus.

The invention claimed is:

1. An optical communication module insertable in and removable from a host substrate, comprising:
   a control unit for monitoring said optical communication module and repeatedly receiving log information about a state of said host substrate from said host substrate;
   a nonvolatile memory; and
   a volatile memory, wherein
   when a hazard signal indicating an abnormality of said host substrate is not detected, said control unit writes, in said volatile memory, a result of monitoring of said optical communication module and said log information from said host substrate, and then, when said hazard signal is detected, said control unit transfers, from said volatile memory to said nonvolatile memory, said result of monitoring of said optical communication module and said log information from said host substrate.

2. The optical communication module according to claim 1, wherein
   when receiving said log information from said host substrate, said control unit writes said result of monitoring of said optical communication module in said volatile memory, together with the received log information.

3. A method for recording a log of an optical communication module, comprising the steps of:
   causing an optical communication module insertable in and removable from a host substrate to perform self-monitoring;
   causing said optical communication module to receive log information about a state of said host substrate from said host substrate;
   writing, in a volatile memory mounted on said optical communication module, a result of said self-monitoring by said optical communication module and said log information received by said optical communication module, when an abnormality relating to power supply from said host substrate to said optical communication module is not detected; and
   writing, in a nonvolatile memory mounted on said optical communication module from said volatile memory, said result of said self-monitoring by said optical communication module and said log information received by said optical communication module, when said abnormality is detected.

4. An optical communication apparatus, comprising:
   a host substrate;
   a plurality of optical communication modules, each of which is insertable in and removable from said host substrate and includes a nonvolatile memory; and
   a power supply switching unit in said optical communication apparatus, wherein
   each of said plurality of optical communication modules performs self-monitoring and repeatedly receives log information about a state of said host substrate from said host substrate,
   when an abnormality relating to power supply from said host substrate to said optical communication modules occurs, each of said plurality of optical communication modules writes, in said nonvolatile memory, a result of said self-monitoring and said log information from said host substrate, and
   said host substrate transmits the log information to said plurality of optical communication modules at different timings, and
   when the abnormality relating to said power supply from said host substrate is detected, said power supply switching unit supplies power to said optical communication modules in place of said host substrate, at least until writing in said nonvolatile memory is completed.

5. The optical communication module according to claim 1, further comprising
   a power supply monitoring unit, wherein
   said power supply monitoring unit outputs said hazard signal when an abnormality relating to power supply from said host substrate to said optical communication module is detected, and
   said abnormality relating to said power supply includes a case in which a power supply voltage supplied from said host substrate during operation of said optical communication module falls outside a prescribed range.

* * * * *